United States Patent [19]

Roberson, Sr.

[11] Patent Number: 4,658,861
[45] Date of Patent: Apr. 21, 1987

[54] TEST PLUG ASSEMBLY

[76] Inventor: Walter H. Roberson, Sr., P.O. Box 806, Longwood, Fla. 32570

[21] Appl. No.: 822,197

[22] Filed: Jan. 23, 1986

[51] Int. Cl.$^4$ ............................................. F16L 55/12
[52] U.S. Cl. ...................................... 138/90; 138/93; 73/49.8
[58] Field of Search ................. 138/89, 90, 93; 4/255, 4/257; 73/49.8, 46

[56] References Cited

U.S. PATENT DOCUMENTS

| | | | |
|---|---|---|---|
| 614,749 | 11/1898 | Pallas | 138/93 |
| 4,122,869 | 10/1978 | Roberson | 138/93 |
| 4,190,196 | 2/1980 | Larsen | 138/90 X |
| 4,203,473 | 5/1980 | Roberson | 138/93 |
| 4,417,598 | 11/1983 | De Pirro | 138/93 X |

FOREIGN PATENT DOCUMENTS 14942 of 1895 United Kingdom .................. 138/93

Primary Examiner—James E. Bryant, III
Attorney, Agent, or Firm—Neil F. Markva

[57] ABSTRACT

The test plug assembly is used for pressure testing of fluid drain and vent systems. The assembly comprises an inflatable body portion or bulb connected to a rigid holder portion. The rigid holder portion includes a stem section and a plug section. The stem section is hollow and opens at one end into the inflatable body portion and at the other end receives a valve for pumping fluid pressure into the bulb. The body portion is separable from the plug section and includes a clamping edge structure extending along the entire periphery of an open mouth. The plug section has an outer structural configuration to engage the test opening of the fluid drain and vent systems. The plug section also has an inner clamping surface to engage the open mouth clamping edge structure of the body portion. A clamping mechanism is used to secure the clamping edge structure of the body portion against the inner clamping surface of the plug section.

17 Claims, 4 Drawing Figures

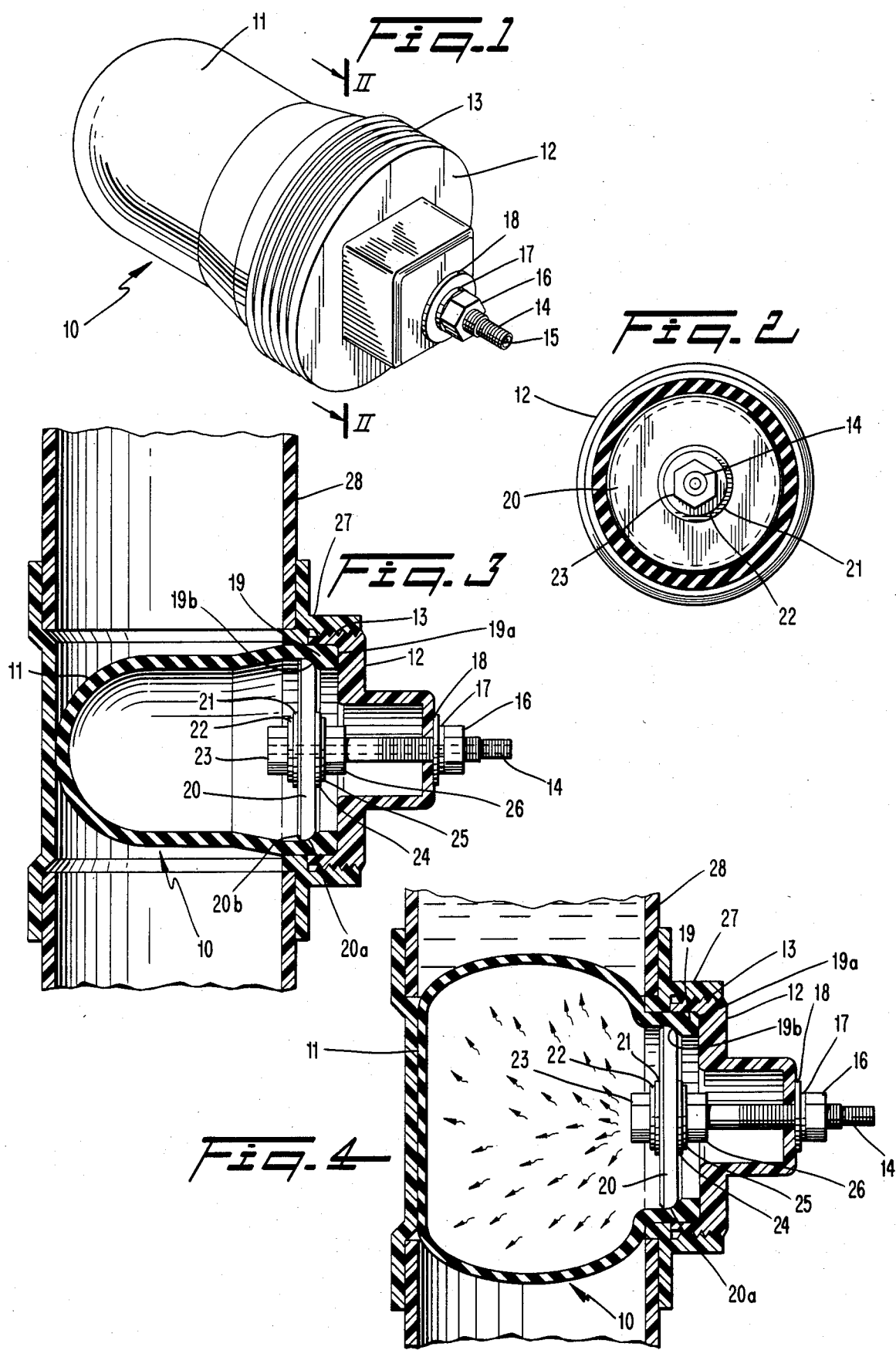

TEST PLUG ASSEMBLY

FIELD OF THE INVENTION

This invention relates to test plug assemblies for sealing fluid conduits. More particularly, the test plug assembly of this invention is used for pressure testing of fluid drain and vent systems. The plug assembly is used for sealing sections of connecting conduits such as a Y or T connection and is also adapted to seal an open end of an incomplete pipeline.

BACKGROUND OF THE INVENTION

It is common in the plumbing industry to test drain and vent systems for possible leakage. It is necessary to seal an installed pipeline and apply a predetermined fluid pressure therein. There are several known devices and assemblies available for accomplishing this purpose such as U.S. Pat. No. 4,122,869.

Until the invention of U.S. Pat. No. 4,122,869, the only means to test for leaks in the drainage system was to insert an inflatable ball in the line through either a T or Y connection. Once in place, the ball is inflated in the line. However, with such testing devices, the ball can easily slip under the fluid pressure. If it does slip, it will be pushed down the line where it will cause a complete stoppage of the system. It may very well be necessary to break up the building construction around the installed plumbing in order to retrieve the ball that has slipped.

To keep the ball from slipping, it is a common practice to overinflate this ball within the line. Thus, an attempt is made to withstand the fluid pressure as well as seal the pipeline. Under these circumstances, the overinflated ball often bursts and is then caused to slip down the line.

The plug assembly of Pat. No. '869 eliminated the overinflation and slippage of the ball with a plug section fixedly disposed in the opening of the pipe system. The present invention constitutes a further embodiment and improvement upon the closure plug test assembly as disclosed and claimed in this earlier patent. The stem end means for connecting the body portion to the holder portion is designed to provide a quick and simple mechanism for assembling the body portion to the holder portion.

PURPOSE OF THE INVENTION

The primary object of this invention is to provide an improved version of my earlier closure plug test assembly.

This invention will continue to provide a closure plug assembly having a rigid connection secured to the drain system being tested with an inflatable body portion which does not have to be overinflated to maintain its position within a pressurized pipe system.

In addition, this invention will provide a closure plug assembly having a very simple construction enabling selective replacement for any part thereof after extensive use.

SUMMARY OF THE INVENTION

The closure plug assembly as disclosed and described includes an inflatable body portion and a rigid holder portion. A particular stem end means connects the body portion to the holder portion which includes a stem section and a plug section. Valve means inflates the body portion through the rigid holder portion.

The stem section is hollow and has an opening directed into the interior of the body portion at the inner end thereof. The stem end means is located at the inner end of the stem section. The other end of the stem section extends through the center of the plug section. The plug section is fixedly disposed in the opening of the pipe system to prevent a flow of liquid therethrough.

The inflatable body portion includes an open mouth end having a clamping edge structure connected to one end of the stem section via the stem end means of this invention. The plug section has an inner clamping engaging surface to engage one side of the clamping edge structure which extends along the entire periphery of the open mouth of the body portion. The stem end means includes means for clamping the clamping edge structure of the body portion against the inner clamping engaging surface of the plug section.

A specific embodiment of the stem end means includes a means secured to the inner end of the stem section for engaging the clamping edge structure to secure the body portion to the plug section. The clamping engaging means thus removably secures the body portion to the plug section. The clamping edge structure has an outer plug engaging surface and an inner peripheral surface defining a compressible cross-sectional configuration therebetween. The clamping engaging means includes a disc member having an outer peripheral edge surface adapted to contact the inner peripheral surface of the clamping edge structure.

The stem means includes tightening means for urging the outer peripheral edge surface against the clamping edge structure of the body portion to secure the compressible cross-sectional configuration therebetween. The tightening means is located outside the plug section and effective to pull the stem section through the plug section thereby urging the outer edge surface of the disc member against the clamping edge structure of the body portion. Thus, the body portion is fixedly secured and connected to the rigid holder portion of the assembly.

A further specific feature of the invention comprises a stem section having an outer threaded surface projecting through the plug section. The tightening means includes a nut member threadingly engaging the outer threaded surface. The stem section has a longitudinal axis and at least a portion of the inner peripheral surface of the clamping edge structure is disposed within a plane that intersects the longitudinal axis of the stem section. This specific embodiment disposes the portion of the inner peripheral surface in a plane which intersects the longitudinal axis at an angle of about 45°.

BRIEF DESCRIPTION OF THE DRAWINGS

Other objects of this invention will appear in the following description and claims, reference being made to the accompanying drawings forming a part of the specification wherein like reference characters designate corresponding parts in the several views.

FIG. 1 is a perspective view of a test plug assembly made in accordance with this invention;

FIG. 2 is a sectional view of the assembly taken along line II—II of FIG. 1;

FIG. 3 is a sectional view of the assembly of FIG. 1 before inflation; and

FIG. 4 is a sectional view of the assembly of FIG. 1 shown in an inflated, operational use.

DETAILED DESCRIPTION

The closure, test plug assembly, generally designated 10, includes an inflatable ball 11 connected to a rigid holder portion including a hollow stem 14 and plug member 12. The stem 14 extends through the plug section 12 and has an outer threaded surface over which the washers 17 and 18 and nut member 16 are disposed. As shown, plug section 12 has a hollow hub section projecting in an outward direction away from the inflatable body portion or bulb 11. A pneumatic valve 15 is disposed at the outer end of stem section 14.

Threads 13 located on plug section 12 engage the inner threads of T27 of line 28. The threaded arrangement constitutes coupling means for securing the cylindrical plug section 12 in place in the T-section 27 throughout the operation of assembly 10.

The inflatable body portion or bulb 11 has a generally cylindrically shaped section having a longitudinal axis extending in a direction outwardly from and coextensive with the plug section 12. Bulb 11 is composed of a resilient material such as rubber or a synthetic material such as Kraton. Bulb 11 includes an open mouth end having a clamping edge structure 19 extending along the entire periphery thereof. Clamping edge structure or shoulder 19 includes an outer plug engaging surface 19a and an inner peripheral surface 19b defining a compressible cross-sectional configuration therebetween. At least a portion of the inner peripheral surface 19b is disposed within a plane that intersects the longitudinal axis of the stem 14. In this embodiment, the plane intersects the longitudinal axis at an angle of about 45° as shown. The body portion or bulb 11 has a longitudinal axis that extends in a direction parallel to the longitudinal axis of the stem 14.

A disc member 20 has an outer peripheral edge surface 20a adapted to contact the inner peripheral surface 19b of the clamping edge structure 19. Disc member 20 is fixedly secured to the inner end of stem section 14 between the combination of sealing members 21 and 24, washer members 22 and 25 and nut members 23 and 26, as shown. The open mouth of body portion or bulb 11 is sufficient to receive disc member 20 when the bulb 11 is out of contact with plug section 12.

Disc member 20 constitutes means secured to the stem section 14 for engaging the clamping edge structure 19 for fixedly holding the body portion to the plug section. As is evident from the drawings and this disclosure, an airtight seal is necessarily formed when the outer, plug engaging surface 19a compressibly engages the inner clamping surface of plug section 12. Nut member 16 threadingly engages the outer threaded surface of stem section 14 projecting through the hub portion of plug section 12. Washers 17 and 18 are disposed between nut member 16 and the hub portion to diffuse the biasing force when nut member 16 is tightened to cause the disc member to move along the longitudinal axis of stem section 14 against the clamping edge structure 19. That is, the outer edge surface 20a of disc member 20 is urged against the inner peripheral surface 19b as the tightening nut member 16 pulls the stem section 14 through plug section 12. This firmly secures the compressible cross-sectional configuration of edge structure 19 between the outer peripheral surface 20a and the inner clamping surface extending around the inside of plug section 12 as shown. The tapered disposition of inner peripheral surface 19b enhances the clamping capability of disc member 20 with respect to the edge structure 19.

Disc member 20 is shown with a substantially matching beveled outer edge surface 20a in this embodiment. It is also contemplated that the outer edge structure of disc member 20 may be substantially cylindrical with a slight bevel at both the top and bottom edge thereof such as the bevel 20b as shown in this particular embodiment. The basic function of the bevel configuration is the same in either situation.

As in previous embodiment of the type of test plug assembly shown in the instant case, stem section 14 is hollow and has an opening directed into the interior of the bulb 11 at the inner end thereof. Valve 15 disposed at the outer end thereof allows air to enter and inflate bulb 11 as shown in FIG. 4. Once the test period is over, bulb 11 is deflated by the normal method of operating the standard pneumatic valve 15 thereby allowing the water held thereabove to move past this test location and subsequent removal of the test plug assembly 10 from the T-connection 27.

While the test plug assembly has been shown and described in detail, it is obvious that this invention is not to be considered as limited to the exact form disclosed, and that changes in detail and construction may be made therein within the scope of the invention without departing from the spirit thereof.

Having thus set forth and disclosed the nature of this invention, what is claimed is:

1. A test plug assembly for the pressure testing of a pipeline in liquid drain and vent systems having a tee or Y-test section with a test opening, said assembly comprising:
   (a) an inflatable, separable body portion including an open mouth end having a clamping edge structure with an inner, peripheral surface extending along the entire periphery of the open mouth,
   (b) a cylindrical plug section having an outer structural configuration to engage said test opening and an inner clamping surface to compressibly engage an outer, peripheral edge surface of the open mouth clamping edge structure of the body portion for forming an airtight seal therebetween,
   (c) coupling means for securing said cylindrical plug section in place in said test section throughout the operation of the assembly,
   (d) clamping structure contacting said inner, peripheral surface of the clamping edge structure of the body portion to urge said outer, peripheral edge surface against the inner clamping surface of the plug section to form said airtight seal, and
   (e) stem means for supporting said clamp structure including valve means for inflating the body portion.

2. An assembly as defined in claim 1 wherein the inflatable body portion has a generally cylindrical shaped section having a longitudinal axis extending in a direction outwardly from and coextensive with the plug section.

3. An assembly as defined in claim 1 wherein the stem section has an opening directed into the interior of the body portion at one end thereof and extends through the plug section at the other end thereof.

4. An assembly as defined in claim 1 wherein said coupling means includes an outer threaded surface on the plug section to engage an inner threaded surface on said test opening into a drain or vent system for threaded engagement with respect to each other.

5. An assembly as defined in claim 1 wherein the outer peripheral edge, plug engaging surface and the inner, peripheral surface define a compressible cross-sectional configuration therebetween.

6. An assembly as defined in claim 1 wherein said clamping edge structure is attached to the stem means for engaging the clamping edge structure of the body portion to secure the body portion to the plug section.

7. An assembly as defined in claim 1 wherein the clamping structure includes a disc member and tightening means,
said disc member having an outer peripheral edge surface adapted to contact the inner peripheral surface of the clamping edge structure,
said tightening means being effective to urge the outer, peripheral edge surface of said disc member compressibly against the inner, peripheral surface of the clamping edge structure.

8. An assembly as defined in claim 7 wherein the stem means includes a hollow stem section having an opening directed into the interior of the body portion at one end thereof and extending through the cylindrical plug section at the other end thereof, and
the tightening means is located outside the plug section and is effective to pull the stem section through the plug section thereby urging the outer edge surface of the disc member against the clamping edge structure.

9. An assembly as defined in claim 8 wherein the stem section has an outer threaded surface projecting through the plug section and the tightening means includes a nut member threadingly engaging said outer threaded surface.

10. An assembly as defined in claim 8 wherein said stem means includes means for sealing and means for threadingly engaging a threaded outer surface of the stem section on either side of the disc member disposed on an inner end portion of the stem section to connect said disc member to said inner end portion.

11. An assembly as defined in claim 1 wherein the entire body portion is composed of a resilient material.

12. An assembly as defined in claim 1 wherein the plug section includes a hollow hub section projecting in an outward direction away from the inflatable body portion.

13. A test plug assembly for the pressure testing of a pipeline in liquid drain and vent systems having a tee or Y-test section with a test opening, said assembly comprising:
(a) an inflatable, separable body portion including an open mouth end having a clamping edge structure with an inner, peripheral surface extending along the entire periphery of the open mouth,
(b) a cylindrical plug section having an outer structural configuration to engage said test opening and an inner clamping surface to compressibly engage an outer, peripheral edge surface of the open mouth clamping, edge structure of the body portion for forming an airtight seal therebetween,
(c) coupling means for securing said cylindrical plug section in place in said test section throughout the operation of the assembly,
(d) clamping means for contacting said inner, peripheral surface of the clamping edge structure of the body portion to urge said outer, peripheral edge surface against the inner clamping surface of the plug section to form said airtight seal,
(e) stem means for supporting said clamping structure including valve means for inflating the body portion,
(f) the clamping edge structure having an outer, plug engaging surface and an inner, peripheral surface defining a compressible cross-sectional configuration therebetween,
(g) the clamping engaging means including a disc member having an outer, peripheral edge surface adapted to contact the inner, peripheral surface of the clamping edge structure, and
(h) the stem means including tightening means for urging the outer, peripheral edge surface against the clamping edge structure to secure the compressible cross-sectional configuration therebetween.

14. An assembly as defined in claim 13 wherein the stem means includes a hollow stem section having an opening directed into the interior of the body portion at one end thereof and extending through the cylindrical plug section at the other end thereof, and
the tightening means is located outside the plug section and is effective to pull the stem section through the plug section thereby urging the outer edge surface of the disc member against the clamping edge structure.

15. An assembly as defined in claim 14 wherein the stem section has an outer threaded surface projecting through the plug section and the tightening means includes a nut member threadingly engaging said outer threaded surface.

16. A test plug assembly for the pressure testing of a pipeline in liquid drain and vent systems having a tee or Y-test section with a test opening, said assembly comprising:
(a) an inflatable, separable body portion including an open mouth end having a clamping edge structure with an inner, peripheral surface extending along the entire periphery of the open mouth,
(b) a cylindrical plug section having an outer structural configuration to engage said test opening and an inner clamping surface to compressibly engage an outer, peripheral edge surface of the open mouth clamping edge structure of the body portion for forming an airtight seal therebetween,
(c) coupling means for securing said cylindrical plug section in place in said test section throughout the operation of the assembly,
(d) clamping means for contacting said inner, peripheral surface of the clamping edge structure of the body portion to urge said outer, peripheral edge surface against the inner clamping surface of the plug section to form said airtight seal,
(e) a stem section with a longitudinal axis and valve means for inflating the body portion,
(f) at least a portion of the inner peripheral surface of the clamping edge structure is disposed within a plane that intersects the longitudinal axis of the stem section at an angle of about 45°,
(g) the clamping engaging means including a disc member having an outer, peripheral edge surface adapted to contact the inner, peripheral surface of the clamping edge structure, and (h) the stem section including tightening means for urging the outer, peripheral edge surface against the clamping edge structure to secure the compressible cross-sectional configuration therebetween.

17. A test plug assembly for the pressure testing of a pipeline in liquid drain and vent systems having a tee or Y-test section with a test opening, said assembly comprising:

(a) an inflatable, separable body portion including an open mouth end having a clamping edge structure with an inner, peripheral surface extending along the entire periphery of the open mouth, (b) a cylindrical plug section having an outer structural configuration to engage said test opening and an inner clamping surface to compressibly engage an outer, peripheral edge surface of the open mouth clamping edge structure of the body portion for forming an airtight seal therebetween, (c) coupling means for securing said cylindrical plug section in place in said test section throughout the operation of the assembly, (d) clamping means for contacting said inner, peripheral surface of the clamping edge structure of the body portion to urge said outer, peripheral edge surface against the inner clamping surface of the plug section to form said airtight seal, (e) a stem section and valve means for inflating the body portion, (f) the clamping engaging means including a disc member having an outer, peripheral edge surface adapted to contact the inner, peripheral surface of the clamping end structure, (g) means for sealing and means for threadingly engaging a threaded outer surface of the stem section on either side of the disc member disposed on an inner end portion of the stem section to connect said disc member to said inner end portion, and (h) the open mouth of the body portion is sufficient to receive the disc member when the body portion is out of contact with the plug section.

* * * * *